United States Patent Office 3,437,638
Patented Apr. 8, 1969

3,437,638
METHOD OF SEPARATING POLYCARBONATES FROM SOLUTION
Ludwig Bottenbruch and Hans-Georg Lotter, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Continuation of application Ser. No. 314,557, Oct. 7, 1963. This application Apr. 17, 1967, Ser. No. 631,558
Claims priority, application Germany, Mar. 28, 1963, F 39,350
Int. Cl. C08g 53/14, 53/02, 17/13
U.S. Cl. 260—47                    11 Claims

ABSTRACT OF THE DISCLOSURE

A method for separating a thermoplastic polycarbonate from a solution containing a halogenated aromatic compound having a boiling point between about 130° C. and about 200° C. and anisole by removing by evaporation substantially all of the solvent in the solution with the exception of the aromatic compound or anisole and thereafter flowing the resulting solution into an extruder where the solution is heated while the solvent is permitted to escape through vents in the extruder and the resulting polycarbonate is extruded.

---

This invention relates generally to polycarbonates and, more particularly, to a novel and improved method of separating polycarbonate as a solid from its solvent and is a continuation of application Ser. No. 314,557, filed Oct. 7, 1963, now abandoned.

It has been proposed heretofore to prepare high molecular weight aromatic polycarbonates. One process is disclosed, for example, in U.S. Patent 3,028,365. In accordance with that process, a suitable di(monohydroxy aryl)alkane is reacted with either a carbonic acid diester, phosgene, or a bis-chloro carbonic acid ester of a di(monohydroxy aryl)alkane to make the high molecular weight polycarbonate. In one of the successful commercial processes, phosgene is reacted with a di(monohydroxy aryl) alkane, such as, 2,2-(4,4'-dihydroxy diphenyl)propane, suspended in an aqueous medium containing an alkali and a solvent for the polycarbonate to be prepared. The resulting polycarbonate is dissolved by the solvent, and the alkali neutralizes the hydrogen chloride. The polycarbonate solvent phase is separated from the water phase, such as, by decantation. It is then necessary to separate the polycarbonate from its solvent.

Similar processes are described, for example, in U.S. Patents 2,997,459 and 2,999,846 and in Canadian Patents 578,585 and 576,639.

One process for separating polycarbonate from its solvent is disclosed in U.S. Patent 3,022,271. This process entails flowing a polycarbonate solution in a solvent having a relatively low boiling point, such as, methylene chloride, through an extruder where the solution is first heated to evaporate the solvent and melt the polycarbonate and the molten polycarbonate is forced through a suitable extrusion die. In accordance with this process, it is necessary to control the volatilization of the solvent to avoid substantial evaporation from the solution until after the polycarbonate has reached the point where it is flowable or, in other words, has become molten. In order to prevent the volatile solvent from evaporating too quickly and, thus resulting in the formation of a hard, crusty residue which cannot be handled satisfactorily in the extruder, the patentee applies pressure in the forward end of the extruder and on the first vent or exhaust pipe of the extruder. The last traces of solvent are removed at a later stage in the extruder by applying a vacuum.

The disclosed process for separating polycarbonate from its solvent in an extruder has the advantage of providing polycarbonate in a very desirable form for molding operations. Polycarbonate can either be in the form of strands or the strands, as they are extruded, can be cut into pellets. This process has many disadvantages, however, because it requires the building of a specially-designed extruder in order to handle the highly volatile aliphatic chlorinated hydrocarbon solvents used in the process. Moreover, these aliphatic chlorinated hydrocarbons split off hydrogen chloride at the temperatures required in the extruder. This hydrogen chloride corrodes the extruder, requiring that it be made from expensive alloys resistant to hydrogen chloride corrosion. It has also been found that because of the formation of hydrogen chloride during the solvent removal, some finely divided carbon is formed, which becomes suspended in the polycarbonate product and imparts thereto a grayish color. Moreover, it is often difficult to remove all of the volatile solvent from the polycarbonate, and even the most minute traces of the solvent will result in the formation of some hydrogen chloride, which can damage the extrusion die and molds used later to shape the polycarbonate into the desired articles of manufacture. Still another disadvantage of a process using an aliphatic chlorinated hydrocarbon solvent is that one is limited on the concentration of polycarbonate. Usually, it is impossible to use a solution containing more than 30% polycarbonate solvent in such a process, because concentrations greater than 30% are gels.

It is, therefore, an object of this invention to provide a novel and improved method for separating polycarbonate from the solvent. Still another object of the invention is to provide an improved process for preparing thermoplastic polycarbonate in solid form, for example, in fiber form or as a bristle or wire, which may be cut to granules suitable for being worked up by melting and moulding or extruding for the production of shaped articles as known in the art. Still a further object of the invention is to provide a method for separating polycarbonate from its solvent while avoiding discoloration thereof. A still further object of the invention is to provide a method for separating polycarbonate from its solvent while avoiding the formation of corrosive chemicals, such as hydrogen chloride. Still another object of the invention is to provide a method for separating polycarbonate from its solvent adapted to use solutions of concentrations greater than 30% and often up to 80% solute.

The foregoing objects and others are accomplished in accordance with this invention, generally speaking, by providing a process for separating polycarbonate from its solvent wherein a solution of polycarbonate containing a halogenated aromatic compound having a boiling point between about 130° C. and about 200° C. or anisole as a solvent for the polycarbonate is flowed into an apparatus adapted to heat the flowing solution and evaporate the solvent therefrom while heating the polycarbonate solution to the point where the polycarbonate is in the molten state in the absence of the solvent and thereafter extruding the substantially solvent-free polycarbonate. Preferably, the apparatus is an extruder provided with a multiplicity of vents or exhaust pipes to permit escape of the solvent therefrom as the solution is heated. It is not necessary to apply super-atmospheric pressure on any of the vents of the extruder to control the volatilization of the solvent.

In a preferred embodiment of the process of this invention, polycarbonate is prepared in accordance with the process disclosed in accordance with U.S. Patent 3,028,365, by phosgenating 2,2-(4,4'-dihydroxy diphenyl) propane (Bisphenol A) in an aqueous sodium hydroxide solution having dispersed therein a mixture of methylene chloride or other suitable chlorinated lower aliphatic hydrocarbon, monochloro benzene or other suitable halogenated aromatic solvent miscible with methylene chloride and immiscible with water. As the high molecular weight polycarbonate is formed, it is dissolved in the solvent phase, which is immiscible with water. After reaction has been completed, the solvent phase is separated by decanting it from the aqueous phase. This solvent phase is then heated to evaporate solvent therefrom. Because of its higher vapor pressure, methylene chloride is volatilized more quickly than the monochloro benzene, and heating is continued until practically all of the methylene chloride has been evaporated. The remaining solution of polycarbonate in monochloro benzene is then passed through an extruder provided with two or more vents. The polycarbonate solution is heated as it passes through the extruder to a point above its melting point while evaporating solvent at atmospheric pressure or lower therefrom. The polycarbonate after extrusion contains less than 0.5% and, preferably, less than 0.1% monochloro benzene.

In an alternate embodiment of the invention, polycarbonate is prepared by phosgenation in accordance with the process described in U.S. Patent 3,028,365, as described above, with the exception that only methylene chloride is used as the solvent. After the polycarbonate solution has been prepared and separated from the aqueous phase, monochloro benzene or other suitable halogenated aromatic solvent miscible with methylene chloride and immiscible with water is mixed with the solution. The solution in mixed solvent is then heated to concentrate it to a solute concentration of about 50% to about 80%. During this process, the methylene chloride is largely evaporated. The remaining solution of polycarbonate in monochloro benzene with only traces of methylene chloride is then passed through the extruder, as described above. If desired, the monochloro benzene may be mixed with the methylene chloride solution prior to separation of the solution from the aqueous phase.

Any suitable halogenated aromatic compound having a boiling point between about 130° C. and about 200° C. which is a solvent for polycarbonates and is substantially immiscible with water may be used in practicing this invention. Examples of such compounds include monochloro benzene (boiling point 132° C.), o-dichloro benzene (boiling point 179° C.), m-dichloro benzene (boiling point 173° C.), p-dichloro benzene (boiling point 174° C), monobromo benzene (boiling point 156° C.), o-chloro toluene (boiling point 159° C.), m- and p-chloro toluene (boiling point 162° C.), o-bromo toluene (boiling point 182° C.), and m- and p-bromo toluene (boiling point 184° C.). Anisole or, in other words, methoxy benzene, having a boiling point of about 154° C. may also be used.

Suitable chlorinated lower aliphatic hydrocarbons which are used in the known processes for the production of polycarbonates by phosgenating aromatic dihydroxy compounds in a two phase system, include, for example, methylene chloride, ethylene chloride, dichloro ethylene, chloroform, tetra chloro methane and others.

It has been found that by substituting one of the solvents disclosed as suitable herein for the chlorinated aliphatic solvents of the prior art, it is not necessary to control the evaporation of the solvent from the solution in the extruder as rigidly as it is in practicing the process disclosed in U.S. Patent 3,022,271. It is not necessary to apply pressure to prevent volatilization of the solvent as the solution is heated to a point where the polycarbonate will flow. The solvent may be permitted to escape through vents in the extruder without the application of pressure to retard volatilization and prevent the polycarbonate from becoming a hard, crusty mass which cannot be handled easily in an extruder. In fact, the solvent used in accordance with this process may be permitted to escape continuously along the length of the extruder, if desired, without the polycarbonate becoming a hard, crusty mass which cannot be handled by the extruder.

Conventional extruders may be used in practicing the process of this invention. These extruders may have one screw and may be provided with one or more exhaust pipes. Preferably, however, the extruder is a double-screw extruder and has a plurality of vents or gas exhaust pipes. It is preferred to apply vacuum to at least the vent immediately before the extrusion die in order to insure substantially complete removal of solvent from the polycarbonate before it passes through the extrusion die.

It has been found that, surprisingly, these higher boiling solvents can be evaporated from the polycarbonate with no more difficulty than methylene chloride, chloroform, ethylene chloride, or similar aliphatic solvents having a much lower boiling point. The residual solvent content of the extruded polycarbonate may be reduced to a low level of 0.1% or even below 0.05% in the extruder. The solvents provided by this invention have the added advantage of being substantially stable at high temperatures and against moisture and, thus, do not result in discoloration of the polycarbonate.

This invention may be used to separate polycarbonate from its solvent in rather high concentrations. For example, it is possible to use polycarbonate solutions containing 40% or more and, often, up to about 80% polycarbonate solute. Because of the ability to use these higher concentrations of poly-carbonate solution, the capacity of the extruder is greater than when solution containing methylene chloride as the only solvent is used.

As pointed out hereinbefore, it is not only possible to use the solvents provided by this invention for making the polycarbonate and then separating the polycarbonate from the solvent; it is also possible to use one of the solvents provided by this invention in admixture with one of the more volatile chloride aliphatic solvents. After the polycarbonate has been prepared under these conditions, the solution is heated, such as, for example, in a thin-layer evaporator, to evaporate the more volatile solvent, such as, methylene chloride, and to leave behind a polycarbonate solution having as practically all of its solvent the higher boiling chlorinated aromatic compound. The invention, thus, provides a process which permits one to prepare a polycarbonate in a rather dilute solution in methylene chloride or mixture thereof with monochloro benzene, for example, and then concentrate the solution by evaporating the methylene chloride and leaving behind the less volatile monochloro benzene or the like. Although the polycarbonate is normally only soluble to a small extent in monochloro benzene at room temperature, it is sufficiently soluble at elevated temperatures to provide solutions having from about 40% to about 80% solute. In practicing this process, one should maintain the temperature of the monochloro benzene solution at a point where the polycarbonate will not gel. A 40% Bisphenol A based polycarbonate prepared in accordance with the process of U.S. Patent 3,028,365 will not gel at temperatures of 120° C. or above at atmospheric pressure. By heating the solution under pressure, it is possible to raise the temperature to the point where a very concentrated solution of up to 80% may be passed through an extruder in accordance with this invention.

In one of the preferred embodiments of the invention, an extruder having a barrel with a pair of side-by-side worm flights and three spaced vents between the feed end thereof and the extrusion die at the other end thereof is provided. The worm flights rotate in the same direction and are driven by a suitable motor. In using the extruder in accordance with this invention, a polycarbonate solution containing about 40% polycarbonate solute and about 60% solvent for the polycarbonate of which about 99.5% or more is monochloro benzene or the like is pumped into the feed end of the extruder. The worm flights move the solution forward in the barrel as the solution is heated to a temperature above the melting point of the polycarbonate. When the polycarbonate solution reaches the first vent, most of the solvent passes out immediately through the vent. This vent is exposed to atmospheric pressure or a vacuum is applied. The resulting polycarbonate still containing some monochloro benzene is then carried forward by the worm flights until a second vent is reached. At this point, additional solvent passes out through the vent, which may be either at atmospheric pressure or, preferably, at subatmospheric pressure. The temperature of the extruder is at a point where the polycarbonate is molten. The molten polycarbonate is then carried by the worm flights forwardly until the third vent is reached, at which the pressure is maintained at 0.1 mm. or less in order to insure the removal of substantially all of the solvent from the polycarbonate. The substantially solvent-free polycarbonate then passes through a suitable extrusion die, where it is cut as it emerges into suitable lengths to provide pellets which can be molded to various articles of manufacture.

The invention is further illustrated by the following working examples, in which the parts are by weight unless otherwise indicated.

EXAMPLE 1

A solution of about 100 kg. of polycarbonate from bisphenol A (relative viscosity 1.32) in a solvent mixture of about 630 kg. of methylene chloride and about 270 kg. of chloro benzene is continuously concentrated in an amount of about 22 kg. of polycarbonate per hour in a 5-atmosphere steam-heated thin-layer evaporator, so that about a 48% solution results which is practically free from methylene chloride. This solution is then continuously advanced at the same speed (about 22 kg. of polycarbonate per hour) over a conveyor heated to about 140° C. into a single screw which possesses two gas exhaust tubes. Through the first gas exhaust tube the bulk of the solvent is distilled off at atmospheric pressure, and through the second the residual solvent is removed under vacuum (less than 1 mm. of mercury pressure). The diameter D of the screw amounts to 90 mm., the total length 27D, the core diameter 80 mm., the ascent 60 mm. The pressure required to introduce the solution into the extruder amounts to 3–5 atmospheres.

If the experiment is carried out with a 30% methylene chloride solution, a comparable throughput requires a pressure of 25–30 atmospheres to introduce the solution into the extruder, and an obstruction in front of the normal pressure evaporation outlet pipe is needed.

EXAMPLE 2

A solution of about 100 kg. of polycarbonate from bisphenol A (relative viscosity of about 1.32, measured in a 0.5% solution in methylene chloride at about 20° C.) in a solution mixture of about 630 kg. of methylene chloride and 270 kg. of monochloro benzene is continuously concentrated in an amount of about 15 kg. of polycarbonate per hour in a thin-layer evaporator heated with steam at 5 atmospheres, so that about a 48% solution is formed which is practically free from methylene chloride. This solution is then continuously advanced at the same rate over the conveyor, heated to about 140° C., into a double screw apparatus with interjacent screws, which has two gas outlet pipes. Through the first gas outlet pipe, the bulk of the solvent is distilled off under atmospheric pressure, and through the second the solvent residues are removed under vacuum (less than 1 mm. Hg pressure). The diameter D of the screws is 48 mm.; the total length of the extruder is 30D. The speed of the screw is 50 r.p.m. The whole length of the extruder is heated to 270° C., with the exception of the orifice, which has a temperature of 220° C.

The extruded polycarbonate (15 kg. per hour) has a "Hazen" color number of about 60, a total chlorine content of 0.002% and after heating for two hours at 300° C. shows a splitting off of hydrogen chloride of less than 0.2 p.p.m.

EXAMPLE 3

A solution of 100 kg. of polycarbonate from Bisphenol A in 790 kg. of methylene chloride and 110 kg. of o-chloro toluene is concentrated at a rate of 250 kg. per hour (25 kg. of polycarbonate per hour) in a thin-layer evaporator, heated with steam at 10 atmospheres, so that a 63% solution is formed. The highly viscous solution is then advanced over a conveyor heated to 165° C. into the extruder described in Example 2 and evaporated under the conditions described in that example. A polycarbonate is obtained with a chlorine content of 0.004% which shows a spitting off of hydrogen chloride of less than 0.2 p.p.m. after heating for two hours at 300° C.

EXAMPLE 4

Into a mixture of 90.8 kg. of Bisphenol A, 1.59 kg. of p-tert. butyl phenol, 300 kg. of water, 640 kg. of methylene chloride, 270 kg. of chlorobenzene and 103 kg. of a 45% sodium hydroxide solution there are introduced under stirring 47.3 kg. of phosgene at 25° C. within 2 hours. Thereafter 0.3 kg. of triethylamine are added. After stirring for another hour the aqueous phase of the reaction mixture is separated by a centrifuge and the organic phase is washed free of electrolyte with water. One obtains 1000 kg. of a 10% solution of polycarbonate in a mixture of methylene chloride and chlorobenzene. The relative viscosity of the dissolved polycarbonate is 1.30 measured in a 0.5% solution in methylene chloride at 20° C.

As described in Example 2, said polycarbonate solution is continuously concentrated in an amount of about 15 kg. of polycarbonate per hour in a thin-layer evaporator heated with steam at 5 atmospheres so that about a 48% solution of polycarbonate in chlorobenzene is formed which is practically free from methylene chloride. This solution is evaporated in a double screw apparatus with interjacent screws as described in Example 2 also.

The very bright extruded polycarbonate has a total chlorine content of 0.002% and after heating for 2 hours at 300° C. shows a splitting off of hydrogen chloride of less than 0.2 p.p.m.

EXAMPLE 5

Into a mixture of 90.8 kg. of bisphenol A, 1.59 kg. of p-tert. butyl phenol, 300 kg. of water, 640 kg. of methylene chloride and 103 kg. of a 45% sodium hydroxide solution there are introduced under stirring 47.3 kg. of phosgene at 25° C. within 2 hours. Thereafter 0.3 kg. of triethylamine are added. After stirring for another hour the aqueous phase of the reaction mixture is separated by a centrifuge and the organic phase is washed free of electrolyte with water. One obtains 730 kg. of a 13.7% solution of polycarbonate in methylene chloride. The relative viscosity of the dissolved polycarbonate is 1.30, measured in a 0.5% solution in methylene chloride at 20° C.

To said solution there are added 270 kg. of chlorobenzene under stirring. The so obtained mixture is evaporated in a thin-layer evaporator as described in Example 2. The resulting polycarbonate solution in chlorobenzene which is practically free from methylene chloride is worked up in a double screw apparatus with interjacent screws also as described in Example 2. The so obtained polycarbonate has the same properties as that obtained according to Example 4.

Although the invention has been described in considerable detail in the foregoing for the purpose of illustration, it is to be understood that such detail is solely for this purpose and that variations may be made by those skilled in the art without departing from the spirit and scope of the invention, except as is set forth in the claims.

What is claimed is:
1. A method for separating a thermoplastic polycarbonate from a solution thereof in a solvent mixture containing a halogenated aliphatic hydrocarbon having a boiling point less than about 130° C. and halogenated aromatic compounds having a boiling point between about 130° C. and about 200° C. which comprises heating to remove by evaporation substantially all of the halogenated aliphatic hydrocarbon from the solution, and thereafter flowing the resulting solution into an extruder where the solution is heated to gradually increasing temperatures while the solvent is permitted to escape through vents in the extruder exposed to a pressure of not more than atmospheric and the resulting molten polycarbonate is extruded through a die.

2. The process of claim 1 wherein the pressure on at least the last vent in the extruder is lower than atmospheric.

3. The process of claim 1 wherein the said solution contains more than 30% by weight polycarbonate at the time it is placed in the extruder.

4. The process of claim 1 wherein the said polycarbonate has been prepared in a solvent which has a boiling point below 130° C. and this solvent has been replaced in the resulting solution of polycarbonate by a solvent selected from the group consisting of halogenated aromatic solvents having a boiling point between about 130° C. and 200° C.

5. A method for making a polycarbonate which comprises phosgenating a di(monohydroxy aryl) alkane until a high molecular weight aromatic thermoplastic polycarbonate is obtained, said phosgenation being conducted in an aqueous medium containing an alkali and a solvent mixture for the resulting polycarbonate which is immiscible with the aqueous phase, said solvent mixture containing halogenated aliphatic hydrocarbons having a boiling point less than about 130° C. and halogenated aromatic solvents for polycarbonates having a boiling point of from about 130° C. to about 200° C. separating the solution from the aqueous phase, heating to evaporate substantially all of the solvent in the resulting solution which has a boiling point below about 130° C., flowing the resulting solution into an extruder and heating the solution while it moves from the feed end of the extruder to that end having an extrusion die to a point above the melting point of the polycarbonate while simultaneously evaporating the halogenated aromatic solvent from the solution at a pressure of not more than atmospheric, and thereafter extruding the substantially solvent-free polycarbonate through an extrusion die.

6. The process of claim 5 wherein the said group member is monochlorobenzene.

7. The process of claim 6 wherein the said polycarbonate is prepared by phosgenating 2,2-(4,4'-dihydroxy phenyl) propane.

8. The process of claim 5 wherein the phosgenation is conducted in an aqueous medium having methylene chloride and monochlorobenzene suspended therein, the di(monohydroxy aryl) alkane is 2,2-(4,4'-dihydroxy phenyl) propane, and substantially all of the methylene chloride is evaporated from the solution before it is placed in the extruder.

9. A method for making a polycarbonate which comprises reacting a di(monohydroxy aryl) alkane with phosgene in an aqueous medium having suspended therein a substantially water immiscible halogenated aliphatic hydrocarbon solvent having a boiling point below about 130° C., separating the resulting solution of polycarbonate in the said solvent from the water phase, mixing with the solution a halogenated aromatic solvent for polycarbonates having a boiling point of from about 130° C. to about 200° C., heating the solution to evaporate substantially all of the solvent having a boiling point below 130° C. from the solution, flowing the resulting solution of polycarbonate in the higher boiling solvent into an extruder, heating the solution in the extruder to a point above the boiling point of the solvent in the solution to thereby evaporate the solvent from the solution at a pressure of not more than atmospheric and thereafter extruding the substantially solvent-free polycarbonate.

10. A method for separating a thermoplastic polycarbonate from a solution thereof in a solvent mixture containing a halogenated aliphatic hydrocarbon having a boiling point less than about 130° C. and halogenated aromatic compounds having a boiling point between about 130° C. and about 200° C. which comprises heating to continuously remove substantially all of the solvent in the solution with the exception of the halogenated aromatic compound, continuously flowing the solution into an extruder while the solution is gradually heated to the softening point of the polycarbonate while substantially all of the solvent is permitted to escape through vents in the extruder exposed to a pressure of not more than atmospheric and the resulting molten, substantially solvent-free polycarbonate is extruded through a die.

11. A method for separating a thermoplastic polycarbonate from a solution thereof which comprises heating a polycarbonate solution containing a mixture of solvents immiscible with water, one of said solvents being a halogenated aliphatic hydrocarbon having a boiling point below about 130° C. and the other of said solvents being halogenated aromatic compounds having a boiling point between about 130° C. and about 200° C. to a temperature sufficient to vaporize a substantial portion of said solvent having a boiling point below about 130° C., feeding the resulting solution to an extruder where the solution is gradually heated to the softening point of the polycarbonate while substantially all of the solvent is permitted to escape through vents in the extruder at not more than atmospheric pressure and thereafter extruding the resulting molten, substantially solvent-free polycarbonate through a die.

References Cited

UNITED STATES PATENTS

| 3,144,432 | 8/1964 | Fox | 260—47 |
| 3,267,075 | 8/1966 | Schnell et al. | 260—47 |
| 3,294,741 | 12/1966 | Schnell et al. | 260—47 |

GEORGE F. LESMES, Primary Examiner.

U.S. Cl. X.R.

260—34.2, 77.5